(No Model.) 5 Sheets—Sheet 1.
P. KALISCH.
MEANS FOR INSTRUCTION IN ARITHMETIC.
No. 472,057. Patented Apr. 5, 1892.
Fig. 1.
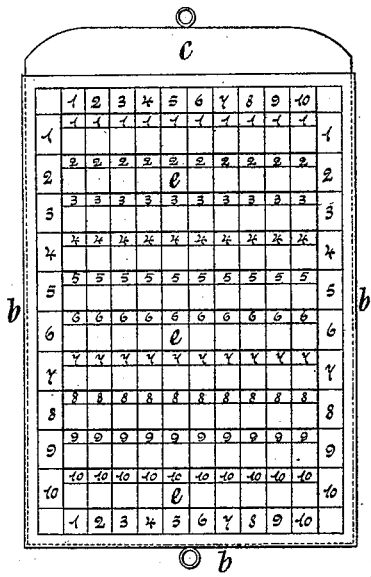
Fig. 2.
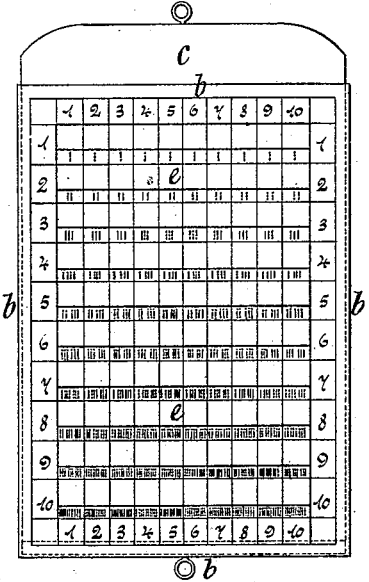
Fig. 3.
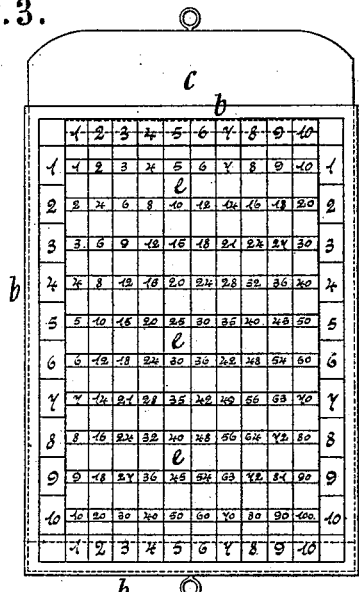
Fig. 4.
Fig. 5.
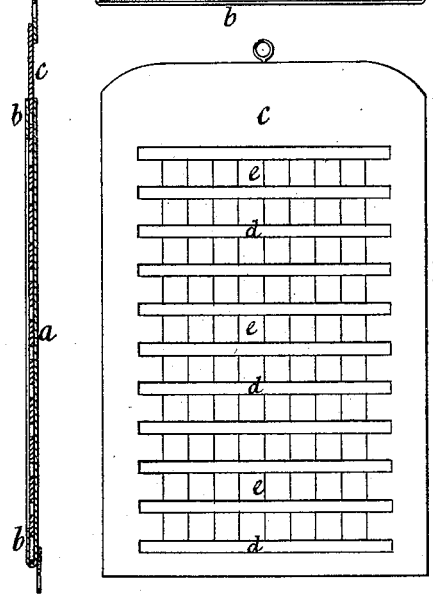
Fig. 6.
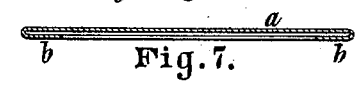
Fig. 7.
Witnesses:
E. B. Bolton
M. A. Walsh
Inventor:
Paul Kalisch
By Richards
his Attorneys.

(No Model.) 5 Sheets—Sheet 2.

P. KALISCH.
MEANS FOR INSTRUCTION IN ARITHMETIC.

No. 472,057. Patented Apr. 5, 1892.

Witnesses:
E. B. Bolton
H. A. Walsh.

Inventor:
Paul Kalisch
By Richards &c.
his Attorneys (No Model.)     5 Sheets—Sheet 3.
P. KALISCH.
MEANS FOR INSTRUCTION IN ARITHMETIC.
No. 472,057.     Patented Apr. 5, 1892.

Witnesses:
E. B. Bolton
M. A. Walsh

Inventor:
Paul Kalisch
By Richards
his Attorneys.

(No Model.) 5 Sheets—Sheet 4.

P. KALISCH.
MEANS FOR INSTRUCTION IN ARITHMETIC.

No. 472,057. Patented Apr. 5, 1892.

Witnesses:
E. K. Bolton
M. A. Walsh

Inventor:
Paul Kalisch
By Richards
his Attorneys.

(No Model.)  5 Sheets—Sheet 5.

P. KALISCH.
MEANS FOR INSTRUCTION IN ARITHMETIC.

No. 472,057.  Patented Apr. 5, 1892.

Witnesses:
E. B. Bolton
M. A. Walsh

Inventor:
Paul Kalisch
By Richard
his Attorneys.

UNITED STATES PATENT OFFICE.

PAUL KALISCH, OF JETSCH, NEAR GOLSSEN, GERMANY.

MEANS FOR INSTRUCTION IN ARITHMETIC.

SPECIFICATION forming part of Letters Patent No. 472,057, dated April 5, 1892.

Application filed November 27, 1891. Serial No. 413,288. (No model.) Patented in Germany March 8, 1891, No. 58,541.

*To all whom it may concern:*

Be it known that I, PAUL KALISCH, manufacturer, residing at Jetsch, near Golssen, in Prussia, Germany, and a subject of the German Emperor, have invented certain new and useful Improved Mechanical Means for Instruction in Arithmetic, (for which a patent has been granted in the German Empire, No. 58,541, dated March 8, 1891,) of which the following is a specification.

My invention relates to improved mechanical means for instruction in arithmetic. Some of the devices hitherto used for facilitating the instruction contain means by which those figures or denominations are covered which during a certain operation of counting are not used to enable a better view. This mode of covering part of the figures is utilized in the improved mechanical means of my present invention. To perform this mode, I employ a kind of grate and a slitted curtain with a double slide. The said grate and curtain may be used separately or jointly, as may be desired, in reckoning with one of the first four rules of arithmetic.

Figure 8:
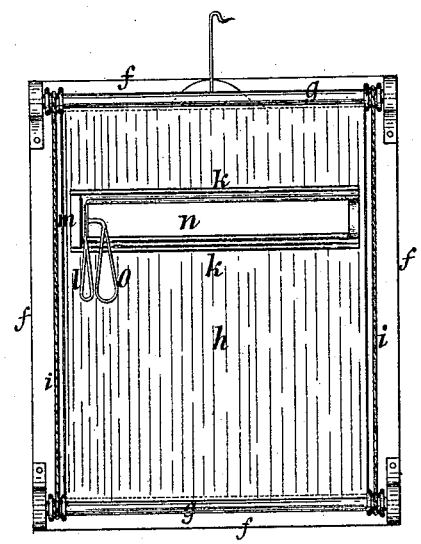
Figure 15:
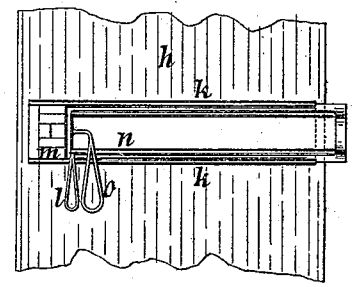
Figure 14:
Figure 16:
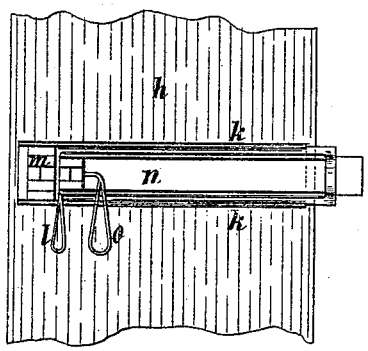
Figure 17:
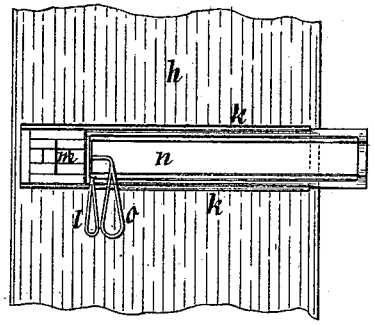
Figure 27:
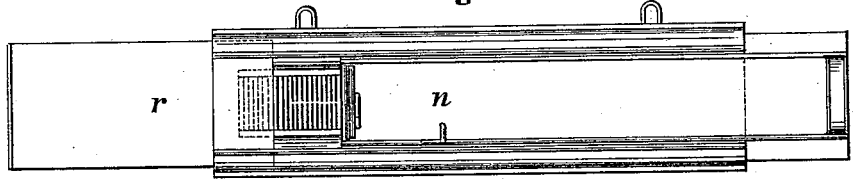

In the accompanying drawings, Figures 1, 2, 3, 11, 12, 13, 18, 19, and 20 represent tables with different systems of figures or denominations. Figs. 4, 6, 7, 9, 10, 14, and 21 show the tables with sliding grate and curtain, partly in front view and partly in section. Fig. 5 is a plan of the sliding grate; Fig. 8, a plan of the curtain. Figs. 15, 16, and 17 represent the curtain with a double slide in varying positions. Figs. 22, 23, 24, 25, and 26 represent the double slide in combination with a single series of strokes; and Fig. 27 represents the double slide fitted with an auxiliary slide.

The table $a$ is surrounded by marginal strips or ledges $b$, which enable a slide $c$ or grate, Fig. 4, to be inserted between the said table $a$ and its surrounding strips $b$. The table $a$ is divided by longitudinal and transverse lines into square fields. The top and bottom strip or ledge $b$ is equally divided by vertical lines into as many square fields as the table contains fields in its transverse rows of fields, while on the two lateral or longitudinal strips or ledges $b$ of table $a$ the division is made in such a manner that three of the fields in the longitudinal rows of the table correspond to one field of the marginal strips.

Figure 9:
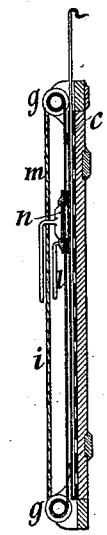
Figure 10:
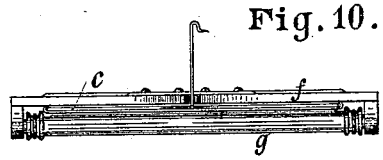
Figures 11, 12:
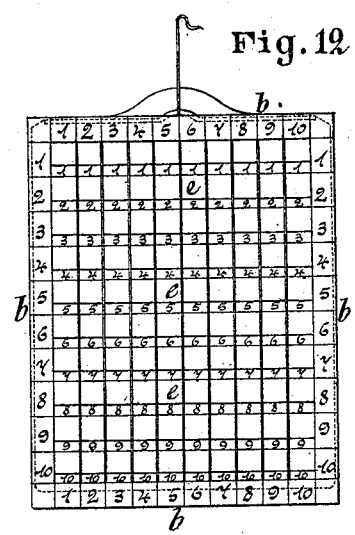
Figure 13:
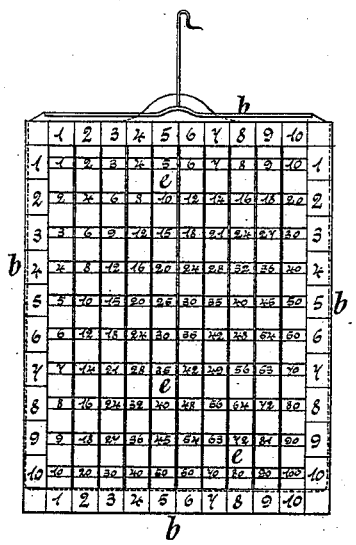

The sliding table or grate $c$, Fig. 5, has cut into it transverse slots $d$, of the same height as the fields on table $a$. The full strip or ledge $e$, between every two of the slots $d$, has the double height of a field of table $a$, and is divided into fields of the same width of the table-fields by vertical lines. When inserted into the strips or ledges $b$ of table $a$, the said grate $c$, as will easily be seen, will cover with each of its full strips $e$ two transverse rows of fields of table $a$, while through each of the slots $d$ of the grate one transverse row of fields of table $a$ is readily seen. To allow a better view, the strokes or dashes may further be distinguished by using a different color for each series of ten strokes. The colored fractions of the second hundred may have different colors from those of the first hundred, the fractions of the third hundred another color than those of the second, and so on. This table of illustration is of particular service if the auxiliary apparatus hereinafter described be employed. This auxiliary or complementary apparatus consists of a frame $f$, into which the board or table $a$ is tightly fitting, still allowing the grate $c$ to be shifted freely, as shown in Figs. 9 and 10. At the top and bottom of frame $f$ a roller $g$ is arranged to turn. On said roller $g$ are respectively fastened the two ends of a linen cloth or fabric $h$, which may be moved in the direction of the length of the table by pulling the endless cords or chains $i$, guided over sheaves on the ends of said rollers $g$. The said curtain $h$ has cut into it a transverse slot, within which a guide-frame $k$ is arranged. This guide-frame $k$ contains another guide-frame $m$, which may be shifted by a suitable handle $l$, and within the second guide-frame $m$ a plate $n$ is arranged to slide, a handle $o$ being provided to shift the same.

In using the table of strokes the grate $c$ is first properly shifted to leave the rows of strokes open while the others are covered. (See Fig. 11.) Then the curtain $h$ is so shifted over the table that the slide-plate $n$ is settled over one of the transverse rows of strokes— for instance, over the topmost row. Now the guide-frame $m$ and slide-plate $n$ are shifted together as much as to leave the first field open to view, Fig. 15, wherein one stroke or dash is seen. Then the slide $n$ is drawn from its frame $m$ as much as to leave another field open to view, the frame $m$ still remaining in its position, Fig. 16. The second stroke or dash is now open to view, separated from the first one by the thin small side of the frame $m$. Now on drawing the frame $m$ equally out, as shown in Fig. 17, it will be conspicuous to the scholar that the two strokes which he sees belong together and are to be considered as a sum of two units. In the same manner a variety of arithmetic operations may be methodically illustrated by successively shifting the frame and slide. It should be particularly noticed that there are two slides within the recess or slot of the curtain. Only to this circumstance, that both slides $m$ and $n$ may be shifted either together or singly, it is due that described method of demonstration may be performed—i. e., it is only by this means that first one stroke or group of strokes, then another stroke or group of strokes may be produced singly before the scholar, and then a combination of both strokes or groups of strokes. With a single slide this could not be performed. The use of this double slide will be hereinafter described as employed to special tabular designs, which enable to demonstrate and exercise by the same mechanical means the arithmetic with fractions. To perform this, I employ a sliding table in combination with a fraction-table.

Figure 18:
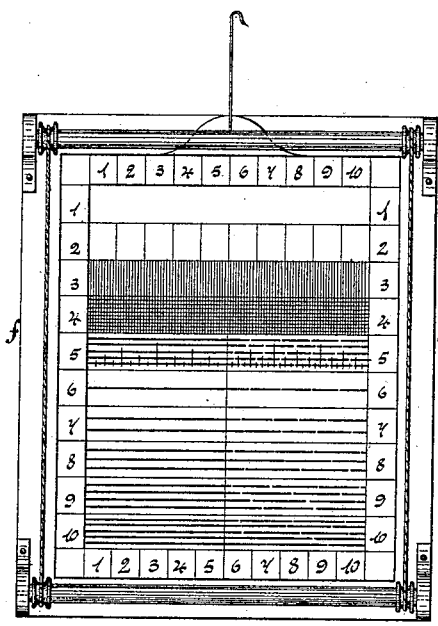

When the apparatus of my invention is to be employed for teaching counting with fractions, the said sliding table is put into the frame $f$, between the grate $c$ and curtain $h$. The said sliding table is divided into ten transverse rows corresponding to the ten fields of the marginal ledges $b$ of table $a$, as shown in Fig. 18. The curtain in this figure is not shown, in order to better represent the divisions of the table. The first four transverse rows from the top downward serve to teach the decimal-fraction system, the lower six rows for the common fractions. The uppermost row is a black field without any subdivision. The second row is divided by vertical lines into ten equal fields. The third row is divided by vertical lines into a hundred equal fields, and the fourth row by vertical and longitudinal lines into a thousand equal fields. The fifth row, or the uppermost of those rows which serve to teach the common fractions, is divided by ten horizontal lines, the right hand and left hand half-row containing each five horizontal lines. The uppermost one of these five lines in each half-row is not subdivided. The second one in the left-hand half-row is divided into two equal halves, the third one into four equal parts, the fourth one into eight equal parts, and the fifth one into sixteen equal parts. In the right-hand half-row the second line from the top is subdivided into three equal parts, the third line into six equal parts, the fourth one into nine equal parts, and the fifth one into twelve equal parts. The following or sixth transverse row is divided into a left hand and a right hand half-row. Each half-row is subdivided by one longitudinal or horizontal line. The seventh row has within each of its right and left hand half rows two horizontal subdividing-lines. The eighth row has within each of its right and left hand half-rows three subdividing horizontal lines. The ninth row has four, and the tenth row five horizontal subdividing-lines in each of the half-rows. To better distinguish, these subdividing or fractional lines may be alternately put in different colors.

Figure 19:
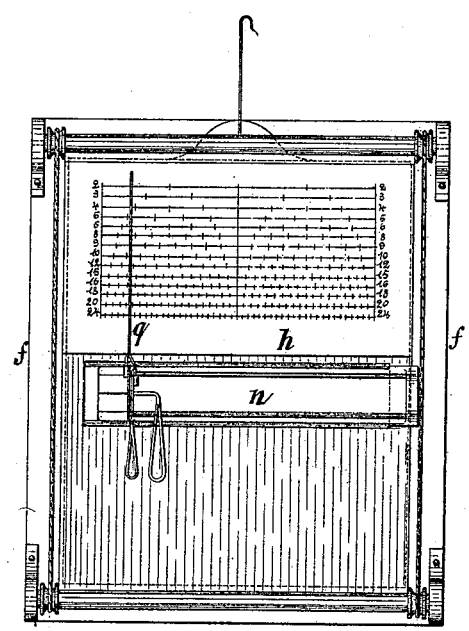
Figure 20:
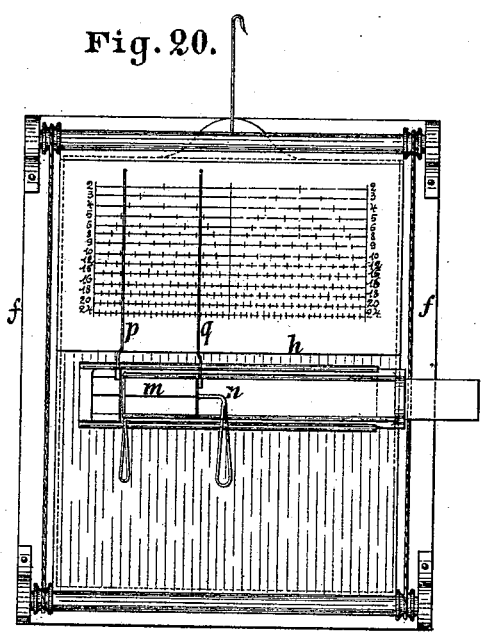
Figure 21:
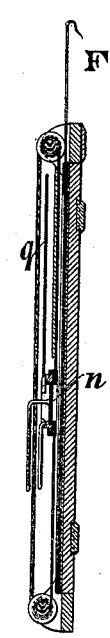
Figure 22:
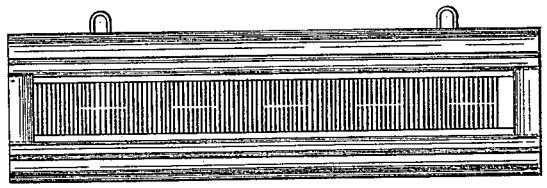
Figure 23:
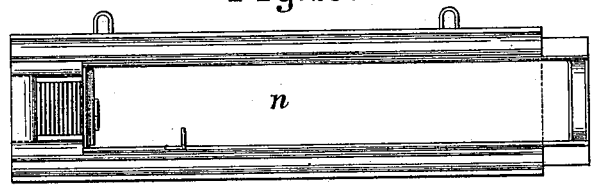
Figure 26:
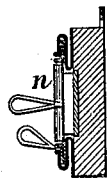
Figure 24:
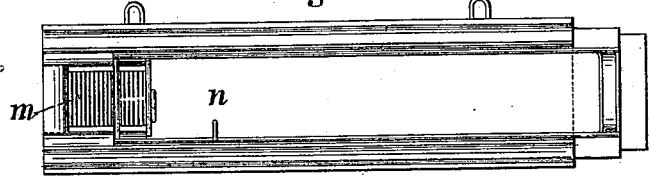
Figure 25:
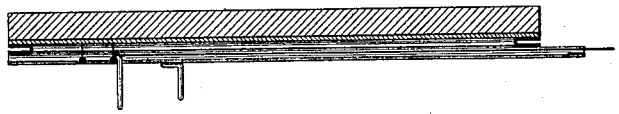

In combination with the slide-curtain, the first four transverse rows of the sliding table serve to explain the origin or development of the decimal fractions down to the thousandth. The slide $n$ is fully withdrawn from the slide-frame $m$, whereby the first or uppermost blank transverse row is fully seen through the recess in the curtain $h$. This blank row signifies a unit or whole. By shifting the curtain downwardly the recess or slot subsequently is brought over the second, third, and fourth transverse rows, thereby showing step after step how a unit may be divided into ten, hundred, and thousand equal parts. When the origin of the decimal fractions has thus been explained, the various operations of reckoning with the decimal fractions may be performed by the aid of the double slides $m$ and $n$ in such a manner that the said slides are shifted singly or jointly over the one or other of the transverse rows. The topmost of the rows, which serve to explain the common fractions—i. e., the fifth row—on the slide-table serves to demonstrate the origin of these fractions, which the scholar perceives from the subdivisions of the horizontal lines. The further rows of this system serve to perform the operations of reckoning with common fractions, to which purpose a table of fractions is employed as an auxiliary means. This table of fractions, Figs. 19 and 20, is secured to the upper half of the curtain $h$, and consists of fourteen horizontal lines divided into halves by a common central line perpendicular to the fourteen lines. These horizontal lines are of exactly the same length as the horizontal lines on the sliding table of Fig. 18. The topmost of the fourteen horizontal lines in each half is subdivided by a little dash into two equal parts, the second line into three parts, the third one into four parts, and so on. Each line has the number of its subdivisions written by its side. The two shifting slides $m$ and $n$ have each removably secured to them a finger $p$ and $q$, which extend over the table of fractions. The double slide $m$ and $n$, as before described, and combined with the sliding table and table of fractions, serves to perform the reckoning operations with common fractions, as will be more readily understood by the following example—viz., add two-ninths to five-ninths. To represent the question mechanically, place the two slides $m$ and $n$ over the sixth row of the sliding table, Fig. 18, which row has one horizontal subdivision, and shift the two slides $m$ and $n$ in such a manner as to make two-ninths of the dividing-line visible. This is easily performed by shifting the slides so much that their two fingers $p$ and $q$ are coincident over the second-division dash of the horizontal line marked "9" of the table of fractions. (See Fig. 19.) When this has been done, the teacher shifts the slide-plate $n$ by further five division-dashes of the same line 9, thus placing the finger $q$ over the seventh dash of the said line. (See Fig. 20.) Now follows the methodical solution of the theme, the teacher shifting step by step or from dash to dash the slide-frame $m$ toward the slide $n$, each step having the distance of one-ninth of the line. By the first step the finger $p$ arrives on the third dash of the line 9, and the teacher shows that two-ninths plus one-ninth make three-ninths. Then the finger is set on the fourth dash, which shows that three-ninths plus one-ninth make four-ninths, and so on till by adding one-ninth in every step the finger $p$ coincides again with the finger $q$ over the seventh dash or division of line 9, showing that two-ninths plus five-ninths makes seven-ninths.

To exercise arithmetic examples of a more simple kind, the mechanical apparatus shown in Figs. 22 to 28 will be found sufficient, said apparatus being a part of the table shown in Fig. 2. It contains but one single transverse row, divided into one hundred fields. To enable a better survey, each group of ten vertical lines may be colored differently from the adjacent groups. The double slide $m$ $n$ is used in combination with this apparatus in the same manner as with the other tables. Finally, I employ in some cases a small auxiliary slide $r$, by means of which, for distinct purposes of use, some of the figures or marks of the table may be covered in order to have a better survey over the operations performed with the slides $m$ and $n$. If, for instance, the teacher will show how to figure below or above ten—for instance, 3 or 13—another figure is to be added. He covers by the slide $r$ as many of the strokes or dashes of the first group to leave but three uncovered after the two slides $m$ and $n$ have been shifted back correspondingly. Now the said slides $m$ and $n$ are simultaneously shifted farther back to the amount of the first group of ten divisions, and on the table will be seen three divisions. Now, if another figure is to be added to 3 the innermost slide $n$ is shifted out as much as this figure amounts to, and then the sum is received as known by letting the slide $m$ follow step by step or dash for dash. (See Fig. 27.) If the first figure instead of 3 is 13, the two slides $m$ and $n$ are simultaneously shifted outward, not only to the amount of the first group of ten divisions, but farther on to the amount of the second group of ten divisions. The operations are then carried on as with the other additions. The auxiliary slide $r$ may in the same or similar manner be employed in connection with the other counting-tables, hereinbefore described.

I claim as my invention—

1. An improved mechanical means for instruction in arithmetic, consisting of a table divided into fields, which contain the characters or figures of three tabular-reckoning systems, in combination with a grate $c$, sliding in the frame $b$, and with a curtain $h$, having within a slot or recess two slides $m$ and $n$, which, being shifted simultaneously or separately, disclose subsequently or jointly the figures or characters which appear under the slot of the curtain.

2. An improved mechanical means for instruction in arithmetic, consisting of the combination, with a sliding curtain $h$ and a double slide $m$ $n$, secured thereto, of a table of fractions containing ten transverse rows subdivided, as described, and another table of fractions secured to the curtain, said table containing horizontal subdivided lines, as described, to determine the position of the slides $m$ and $n$ by means of fingers $p$ and $q$, secured to said slides and extending over said table of fractions, substantially as described.

3. The combination, with the double slide $m$ $n$, as described, of an auxiliary slide $r$ to cover distinct parts of the figures or characters contained on the reckoning-table, as described.

In testimony whereof I have hereunto set my hand, in the presence of two subscribing witnesses, this 7th day of November, 1891.

PAUL KALISCH.

Witnesses:
 OTTO ACKERMANN,
 MARIE ACKERMANN.